MULTIPLE FUNCTION ADJUSTMENT MEANS

Filed Sept. 9, 1966 3 Sheets-Sheet 1

INVENTORS
DOMINICK A. MASSA
RICHARD W. BLOHM
BY Hofgren, Wegner, Allen, Stellman & McCord
ATTORNEYS.

MULTIPLE FUNCTION ADJUSTMENT MEANS

Filed Sept. 9, 1966

3,411,367
Patented Nov. 19, 1968

3,411,367

MULTIPLE FUNCTION ADJUSTMENT MEANS

Dominick A. Massa, Arlington Heights, and Richard W. Blohm, Norridge, Ill., assignors to Warwick Electronics Inc., a corporation of Delaware Filed Sept. 9, 1966, Ser. No. 578,232
10 Claims. (Cl. 74—10.45)

ABSTRACT OF THE DISCLOSURE

A control means for an electronic device, such as a color television set, having a plurality of adjustable function controlling devices arranged at fixed positions in a compact area, with a single adjustment means being movable to a plurality of locations, each adjacent to a function controlling device, where it is effective to adjust the selected device. In one embodiment, a drivable means is rotatably mounted at a fixed location on a detent wheel for direct engagement with driven means associated with a selected function controlling device. In a second embodiment, a drivable means is rotatably mounted on an arm that is pivotally mounted on a detent wheel, with the arm being movable relative to the detent wheel to place the drivable means in engagement with driven means associated with a selected function controlling device. In both embodiments the drivable means is rotatable about an axis that is parallel with the axes of the driven means.

This invention relates in general to control means, and more particularly to a new and improved control means for an electronic device, such as a color television set.

In the past, in electronic devices having a plurality of adjustable functions, such as a color television set, individual shafts and knobs have been provided for the control and adjustment of each function. This has created a problem for the aesthetic designers of color television sets, who have resorted to such expedients as hiding several of the control knobs behind a trap door. Because the aesthetic appearance of a color television set often dictates the design criteria thereof, the placement of the adjustable controls has often been determental to good electronic engineering. Accordingly, the general purpose of the present invention is to provide improved control means for a color television set or the like which will harmonize design and engineering considerations, and which will minimize the over-all cost of the set.

An object of the invention is to provide each of the adjustable control means for a color television set, or the like, at a single convenient location on the set, where the controls are clustered around a central axis.

Another object of the invention is to position a plurality of adjustable function controls at fixed positions on a support, and to mount on the support a single movable means for adjusting these controls.

A further object of the invention is to provide means for accurately positioning the adjustment means described in the preceding paragraph at a location where it is effective to adjust a selected control.

Still another object of the invention is to arrange function selector means concentrically with the aforedescribed adjustment means.

A still further object of the invention is to provide the above described control with novel means for preventing the disturbance of the setting of adjusted controls during the selection of particular functions.

Still another object of the invention is to provide motor means for operating the function selector means and the function adjusting means, so that the control means can be remotely operated.

These and other objects of the invention will hereinafter become more fully apparent from the following description, taken in connection with the annexed drawings, wherein.

Figure 2:
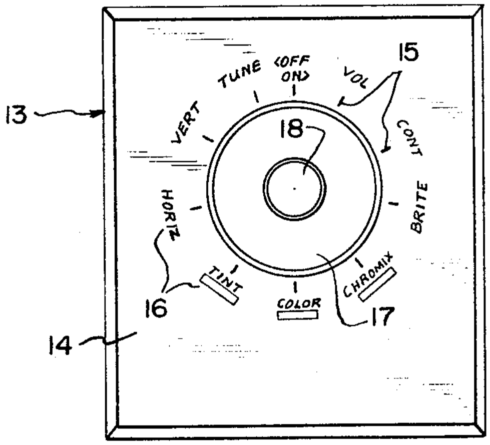
FIG. 2 is an enlarged front elevational view of a portion of the control panel of the television set illustrated in FIG. 1.

An electronic device, such as a color television set 10, includes a control panel 11 having a channel selecting portion 12 and a function selecting and adjusting portion 13. Control panel portion 13 (FIG. 2), includes a panel member 14 having a plurality of indicia 15 arranged concentrically about an axis, and each corresponding to one of a plurality of selectable adjustable functions. An identifying legend 16 is provided on the member 14 adjacent each of the indicia 15. A first control knob 17 is connected to a shaft 17*a* for selecting the function to be adjusted, and a second knob 18 is fixed on a shaft 18*a* for adjusting the selected function (FIGS. 3–5).

Figures 1, 5:
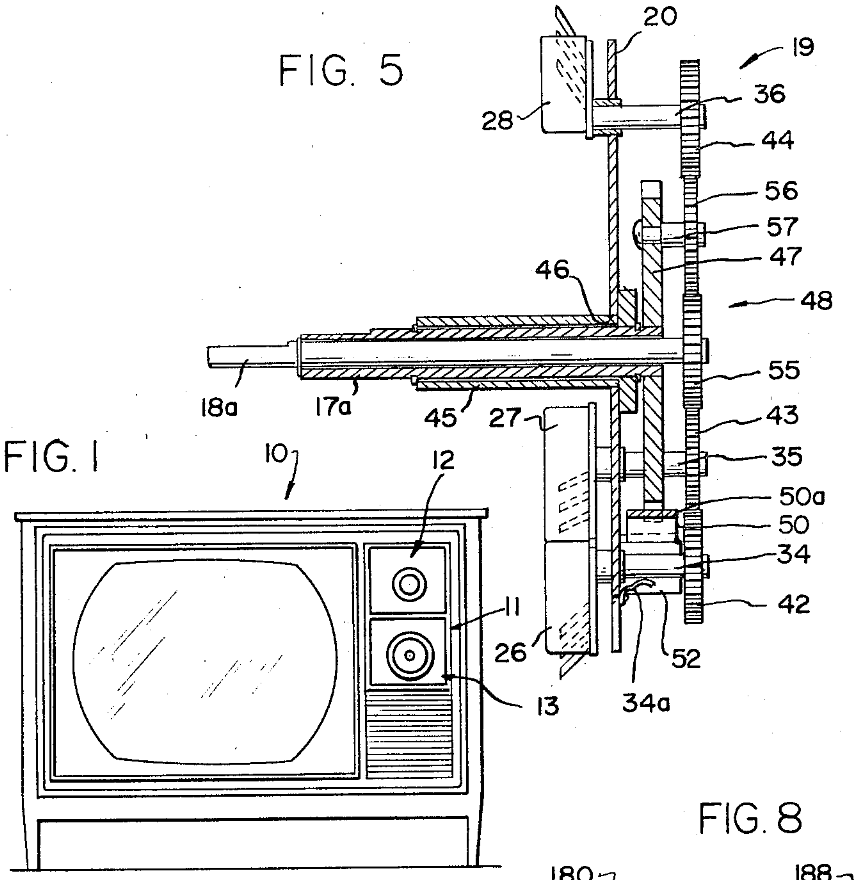
FIG. 1 is a front elevational view of a television set having the control means of the present invention incorporated therein.
FIG. 5 is a sectional view taken generally along line 5—5 of FIG. 3.
Figure 3:
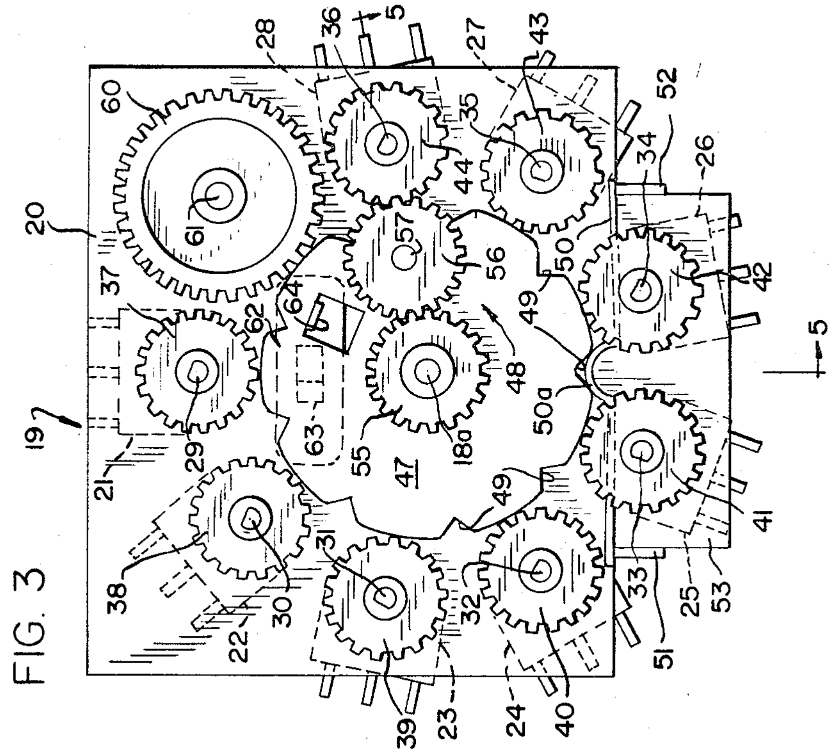
FIG. 3 is an enlarged rear elevational view of the structure immediately behind the control panel portion illustrated in FIG. 2.
Figure 4:
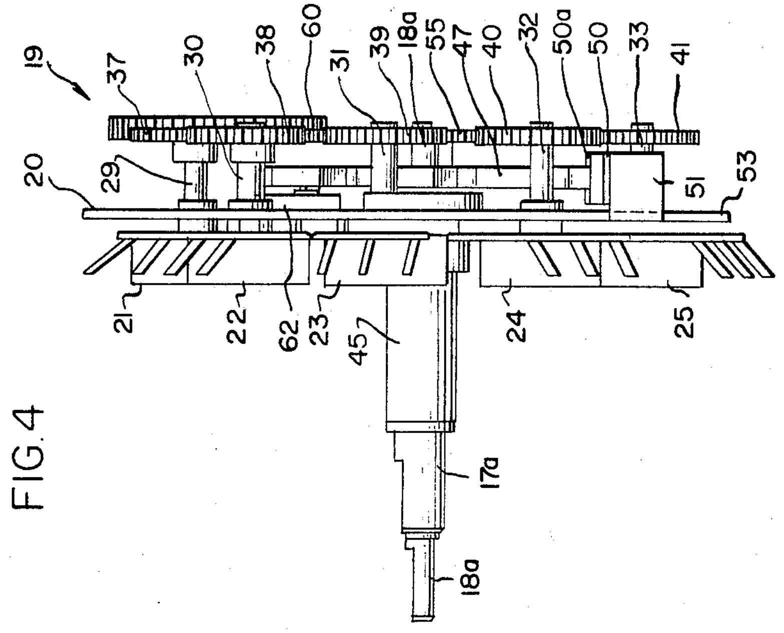
FIG. 4 is a side elevational view of the structure illustrated in FIG. 3, with the control panel and control knobs removed.

The first embodiment of the present invention will be understood from considering FIGS. 3–5, and the control means 19 thereof is carried by a mounting plate 20 secured to suitable support means, not shown, rearwardly of panel member 14. A plurality of variable controls 21–28, such as potentiometers, are mounted at fixed locations on mounting plate 20 concentrically of the axis of shafts 17*a* and 18*a*. Potentiometers 21–28 may provide, respectively, adjustable functions such as, vertical hold, horizontal hold, tint, color, brightness, contrast, volume and tone. Potentiometers 21–28 include respective shafts 29–36, that extend rearwardly through mounting plate 20, and have respective gears 37–44 fixed thereto at the rearward end thereof.

Function selecting means, including shaft 17*a*, is rotatably mounted on mounting plate 20, and a bushing 45 is affixed in an opening 46 in mounting plate 21 centrally of the potentiometer controls 21–28, with function selecting shaft 17*a* being rotatably mounted in bushing 45. Shaft 17*a* extends rearwardly of mounting plate 20, and the function selecting means further includes carrier means, in the form of a detent wheel 47, secured to the rearward end of shaft 17*a*. Function adjusting means, indicated generally at 48, is mounted on detent wheel 47, and is movable therewith into a plurality of positions each adjacent to one of the potentiometer gears 37–44. Detent wheel 47 has a plurality of peripheral notches 49 therein, each notch corresponding to a selectable function adjusting position, and a detent member in the form of a spring 50 has an upraised central portion 50*a* yieldably engageable within a notch 49 to retain the detent wheel 47 in a desired position. The outwardly extending ends of detent spring 50 are preferably secured to rearwardly extending mounting portions 51 and 52 of an extension 53 of plate 20.

Adjusting means 48 includes a drive gear 55 mounted on the rearwardly extending portion of adjusting shaft 18*a*. An idler gear 56 meshes with drive gear 55, and is carried by a stub shaft 57 that is mounted in detent member 47 radially outwardly of drive gear 55. As detent member 47 rotates, the teeth of the outer edge of idler gear 56 move along a circular path that is tangential to teeth at the inner edge of gears 37–44. A further gear 60, larger than gears 37–44, is carried by a shaft 61 rotatably mounted in plate 20, and the teeth of gear 60 are also tangential with respect to the path of movement of idler gear 56. Shaft 61 is coupled to the fine tuning mechanism, not shown, of the television set 10, for fine tuning adjustment thereof, by the adjusting means 48. If gears 37–44 are of different diameters, the control shafts 29–36 and the controls themselves will not be concentric with shafts 17*a* and 18*a*.

Thus, it will readily be understood that any adjustable function, including fine tuning, can be selected by rotating shaft 17*a* to position idler gear 56 in engagement with one of gears 37–44 or 60. The detent wheel 47 and idler gear 56 are positively held in the selected position by the engagement of the detent portion 50*a* of spring 50 with the appropriate notch 49 in the detent member 47. The selected function can then be adjusted by rotating shaft 18*a* to rotate drive gear 55 which rotates idler gear 56, that in turn rotates the driven gear at the selected function position.

Each of driven gears 37–44 and 60 require a predetermined amount of torque to rotate the same. The present invention contemplates the provision of means for preventing the disturbance of the setting of a particular adjustable function during the selection of a function by rotation of shaft 17*a*. For this purpose, friction brake means, as a spring 34*a* bearing against shaft 34 (FIG. 5), or other suitable device, may be provided for each of gears 37–44 and 60 to control the amount of torque necessary to rotate the same. The amount of torque necessary to rotate idler gear 56 and adjusting shaft 18*a* is substantially less than the amount of torque required to rotate gears 37–44 and 60, so that when the function selecting shaft 17*a* and detent member 47 are rotated, the setting of gears 37–44 and 60 is not disturbed. Instead, shaft 18*a* is rotated a slight amount by the action of idler gear 56 on drive gear 55. From the above, it will be readily apparent that the adjusting means 48 can be freely moved to any function position without disturbing the setting of any of the function adjusting means.

The control means of the present invention also controls on-off operation of the television set 10, and for this purpose, an on-off switch 62 is mounted on plate 20. In the present embodiment, switch 62 has been illustrated as a slide switch having a movable switch operator 63. Operator 63 is positioned in the path of movement of a dog 64, pressed outwardly from detent wheel 47, so that the operator 63 is shifted laterally by the dog 64 as the detent wheel 47 is rotated to move operator 63 "on" in one direction of rotation of detent wheel 47 and "off" when detent wheel 47 is rotated in the opposite direction.

Figure 8:
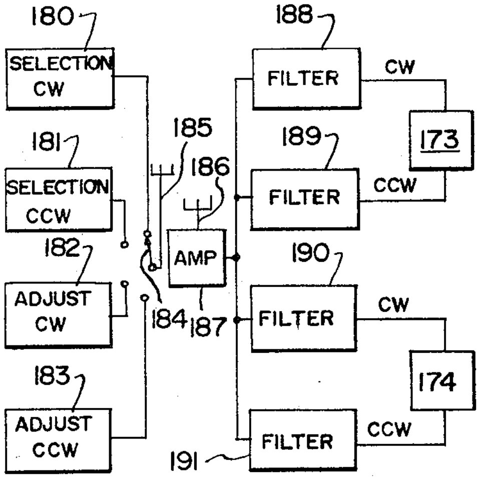
FIG. 8 is a schematic control circuit for the embodiment of FIGS. 6 and 7.
Figure 7:
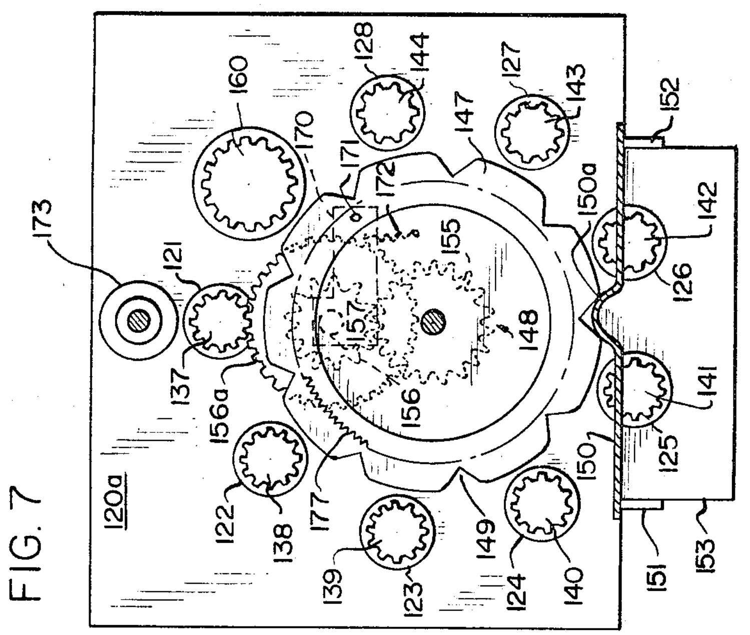
FIG. 7 is a sectional view taken generally along line 7—7 of FIG. 6.
Figure 6:
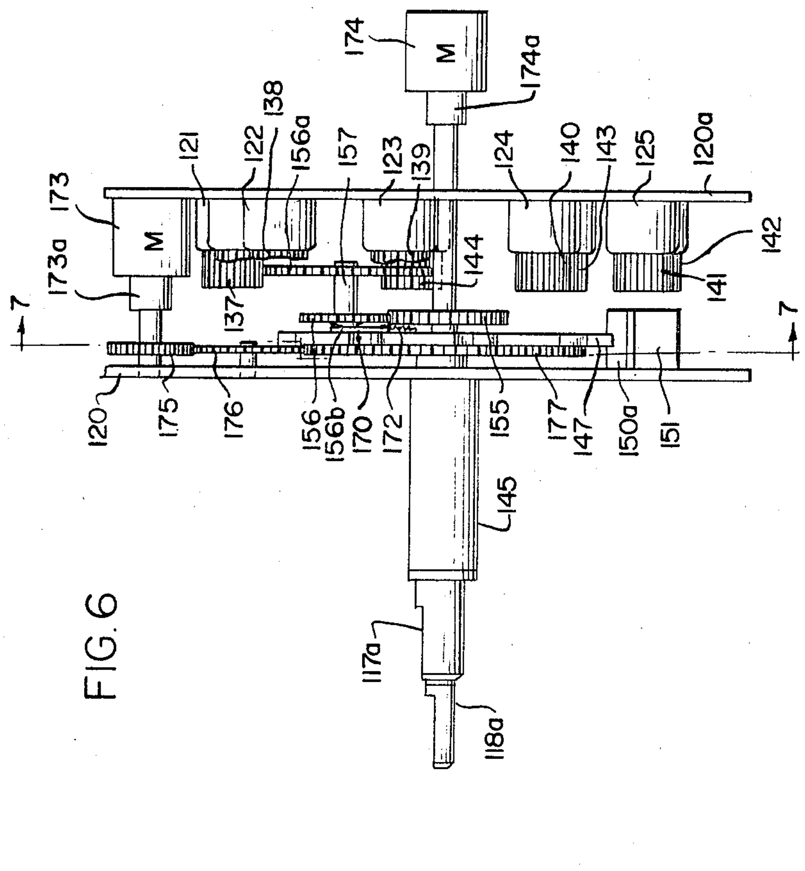
FIG. 6 is a side elevational view similar to FIG. 4, and illustrating a further embodiment of the invention.

Turning now to the embodiment of FIGS. 6–8, it will be noted that the control means illustrated therein is similar to the control means of FIGS. 3–5, so that similar reference numerals have been used to indicate corresponding elements and have been increased by the sum 100. The embodiment of FIGS. 6–8 differs basically from the embodiment of FIGS. 3–5 by having the function adjusting means normally spaced from, rather than adjacent to, the variable controls.

In the embodiment of FIGS. 6–8 a pair of spaced mounting plates 120 and 120*a* are provided, with function adjusting controls 121–128 being mounted on plate 120*a*. Controls 121–128 are positioned about the axis of function selector shaft 117*a* and function adjusting shaft 118*a*. A drive gear 155 is mounted on adjusting shaft 118*a*, and gear 155 meshes with an idler gear 156 on a shaft

157. Shaft 157 is rotatably mounted on an arm 170 that is pivotally secured to detent wheel 147 at 171. Spring 172 is connected between arm 170 and detent wheel 147 to bias the arm 170 in a counterclockwise direction as viewed in FIG. 7. Suitable slip clutch means, such as a spring friction washer 156*b*, is interposed between idler gear 156 and arm 170, so that when adjusting shaft 118*a* is initially rotated, idler gear 156 will not be rotated by drive gear 155, but the arm 170 will be pivoted in a counterclockwise direction about pivot 171 against the bias of spring 172 by the camming action of the teeth on gear 155 against the teeth on gear 156. A further gear 156*a* is mounted on shaft 157 rearwardly of gear 156, and gear 156*a* is movable generally in the plane of the function adjusting gears 137–144 and 160. Spring 172 normally biases the arm 170 to a position where the teeth of gear 156*a* are spaced from the teeth on gears 137–144 and 160, and it will be appreciated that because of this clearance, the function selector shaft 117*a* can be freely rotated without disturbing the setting of any of the adjustable controls. When the function to be adjusted has been selected, the detent wheel 147 is positively retained in the selected position by detent spring 150. The selected function can be adjusted by merely rotating shaft 118*a*, which shifts the idler gear 156 generally radially outwardly until the gear 156*a* engages the driven gear at the selected function position (as shown in FIG. 7). The teeth on the drive gear 155 and gear 156 are constantly in mesh, so that further rotation of shaft 118*a* will adjust the selected function.

Means are provided for remotely controlling the function selecting and adjusting mechanism of FIGS. 6 and 7, and this means includes reversible motors 173 and 174. Output shaft of motor 173 is connected through a suitable drive mechanism, including for example driven gear 175 and idler gear 176, to a ring gear 177 formed integrally with the detent wheel 147. The drive mechanism preferably includes a clutch 173*a* engaged when the motor 173 is energized so that the function selector shaft 117*a* can be manually rotated independently of the motor shaft when desired. The output shaft of motor 174 is coupled to adjusting shaft 118*a*, and again, a suitable clutch means 174*a* couples the shafts when the motor 174*a* is energized, so that the adjusting shaft 118*a* can be manually rotated independently of the motor shaft when desired.

The control circuit for motors 173 and 174 will be best understood from viewing FIG. 8. A suitable four channel signal generating remote control includes signal sources 180–183 for respectively selecting clockwise rotation of the shaft of motor 173, counterclockwise rotation of the shaft of motor 173, clockwise rotation of the shaft of motor 174 and counterclockwise rotation of the shaft of motor 174. A switch 184 is provided for coupling a transmitting antenna 185 to a selected signal source, 180–183. A receiving antenna 186 is associated with the television set 10, and an amplifier 187 is connected to antenna 186 for amplifying the signal received thereby. Filters 188 and 189 are connected in circuit with motor 173, while filters 190 and 191 are connected in circuit with motor 174. Thus, when a signal is received by antenna 186 and amplified by amplifier 187, the appropriate one of filters 188–191 allows the received signal to energize either motor 173 or 174, and to rotate the same in the appropriate direction.

The above described system is also readily adaptable to a three signal channel system, wherein a single channel is provided for stepping selecting motor 173 in one direction, with a pair of channels being provided for rotating adjusting motor 174 in opposite directions.

We claim:

1. In a device having plural function adjusting controls, a selecting and adjusting mechanism comprising: support structure; a plurality of variable function adjusting controls rotatably mounted at fixed positions on said support structure about an axis; an axially fixed function selector shaft mounted on said support structure for rotation about said axis; a carrier member fixed to said selector shaft for rotation therewith to one of a plurality of selectable function adjusting positions; drivable means rotatably mounted on said carrier member for adjusting said variable controls, said drivable means being rotatable about an axis that is fixedly parallel with the axes of said variable function adjusting controls; means for releasably retaining the carrier member in each of said positions to locate the drivable means adjacent one of the variable controls; and an axially fixed adjustment shaft having drive means thereon for driving said drivable means to adjust the selected variable control.

2. A selecting and adjusting mechanism as set forth in claim 1 wherein means are provided for preventing the disturbance of the adjustment of the variable controls during rotation of the selector shaft.

3. A selecting and adjusting mechanism as set forth in claim 2 wherein said drivable means is movable with said carrier member along an arc tangential to said variable function adjusting controls, and each of said variable function adjusting controls has a greater resistance to torque than said adjustment shaft, whereby said function selector shaft and carrier member can be rotated without disturbing the setting of the variable controls.

4. A selecting and adjusting mechanism as set forth in claim 2 wherein said drivable means is carried by an arm pivotally mounted on said carrier member, and spring means urge said arm to a position wherein said drivable means is normally spaced from said variable function adjusting controls, said arm being movable against the bias of said spring to an adjusting position by the engagement of said drive means with said drivable means.

5. In a device having plural function adjusting controls, a selecting and adjusting mechanism comprising: support structure; a plurality of variable function adjusting controls rotatably mounted at fixed positions on said support structure, about an axis, each of said controls having a gear thereon; an axially fixed function selector shaft mounted on said support structure for rotation about said axis; a carrier member fixed to said selector shaft for rotation therewith to one of a plurality of selectable function adjusting positions; idler gear means rotatably mounted on said carrier member for engagement with said control gears to adjust said variable function adjusting controls, the axis of said idler gear means being fixedly parallel to the axes of said controls; detent means on said support structure engageable with said carrier member for releasably retaining the carrier member in each of said positions to locate the idler gear means adjacent one of the gears of a variable control; and an axially fixed adjustment shaft concentric with said selector shaft and having a drive gear thereon for rotating said idler gear means and the selected control gear to adjust the variable control.

6. A selecting and adjusting mechanism as set forth in claim 5 wherein said carrier member is provided with means for controlling on-off operation of said device.

7. A selecting and adjusting mechanism as set forth in claim 5 wherein motor means is connected with said selector shaft and with said adjustment shaft.

8. A selecting and adjusting mechanism comprising: support structure; a plurality of variable controls rotatably mounted at first positions on said support structure about an axis; means for adjusting each of said controls including a rotatable member carrying rotatable drivable means thereon, said drivable means being rotatable about an axis fixedly parallel to the axes of said variable controls, said rotatable member being positionable at a plurality of locations each positioning said drivable means adjacent one of said variable controls; an axially fixed selector shaft coupled to said rotatable member for rotating the same between said positions; motor means coupled to said rotatable member; an axially fixed adjusting shaft having means for driving said drivable means to adjust a selected variable control; and motor means coupled to said adjusting shaft.

9. A selecting and adjusting mechanism as set forth in claim 8 wherein said motor means is reversible.

10. A selecting and adjusting mechanism as set forth in claim 9 wherein means is provided for remotely controlling said motor means.

References Cited

UNITED STATES PATENTS 3,178,948 4/1965 Reinwall.
2,627,056 1/1953 Gleason ---------- 74—353 X
2,981,838 4/1961 Poskozim --------- 74—10.45 X
3,101,628 8/1963 Shelley et al. --------- 74—665
3,150,338 9/1964 Weiner ----------- 74—10.8 X
3,175,407 3/1965 Reinwall ------------ 74—10.8
3,183,726 5/1965 Badger -------------- 74—10.8

MILTON KAUFMAN, *Primary Examiner.*